(12) United States Patent  
Bonanno

(10) Patent No.: US 6,247,743 B1
(45) Date of Patent: Jun. 19, 2001

(54) COVERLET FOR THE REAR PORTION OF A VEHICLE HAVING A ROLL BAR

(76) Inventor: Anthony J. Bonanno, 9450 Greenbriar Rd., Hickory Hills, IL (US) 60457

( * ) Notice: Subject to any disclaimer, the term of this patent is extended or adjusted under 35 U.S.C. 154(b) by 0 days.

(21) Appl. No.: 09/595,418

(22) Filed: Jun. 16, 2000

Related U.S. Application Data

(60) Provisional application No. 60/140,046, filed on Jun. 18, 1999.

(51) Int. Cl.$^7$ ............................................. B60J 7/20
(52) U.S. Cl. ................. 296/136; 296/102; 296/100.02; 296/100.04; 280/756
(58) Field of Search ............................. 296/102, 100.02, 296/100.04, 136; 280/756

(56) References Cited

U.S. PATENT DOCUMENTS

| | | | |
|---|---|---|---|
| 2,631,057 | * 3/1953 | Weaklend | 296/102 |
| 3,301,589 | * 1/1967 | Hayden | 296/102 |
| 3,342,523 | 9/1967 | Lutgen . | |
| 3,622,177 | * 11/1971 | Notestine | 296/102 |
| 3,923,334 | 12/1975 | Key . | |
| 4,199,188 | 4/1980 | Albrecht et al. . | |
| 4,202,579 | * 5/1980 | Berggren | 296/102 |
| 4,406,493 | 9/1983 | Albrecht et al. . | |
| 4,741,570 | 5/1988 | Lovaas . | |
| 4,770,461 | 9/1988 | Lovaas . | |
| 4,789,197 | 12/1988 | Lewis . | |
| 4,813,735 | 3/1989 | Avitable . | |
| 4,943,194 | 7/1990 | Aguilar . | |
| 4,988,141 | * 1/1991 | Takada | 296/102 |
| 5,054,841 | * 10/1991 | Zalman | 296/102 |
| 5,398,985 | * 3/1995 | Robinson | 296/100.02 |
| 5,564,773 | 10/1996 | Lapsley et al. . | |
| 5,743,586 | 4/1998 | Nett . | |
| 5,893,602 | * 4/1999 | Saito | 296/102 |
| 5,947,546 | * 9/1999 | Hilliard et al. | 296/102 |

* cited by examiner

Primary Examiner—Joseph D. Pape
Assistant Examiner—Kiran B. Patel
(74) Attorney, Agent, or Firm—Micahel R. McKenna

(57) ABSTRACT

A secure coverlet for the rear portion of a vehicle having a roll bar comprising interconnecting rigid panels that provide resistance to wind and rain, and secure the contents of the rear compartment despite the protruding roll bar posts.

29 Claims, 4 Drawing Sheets

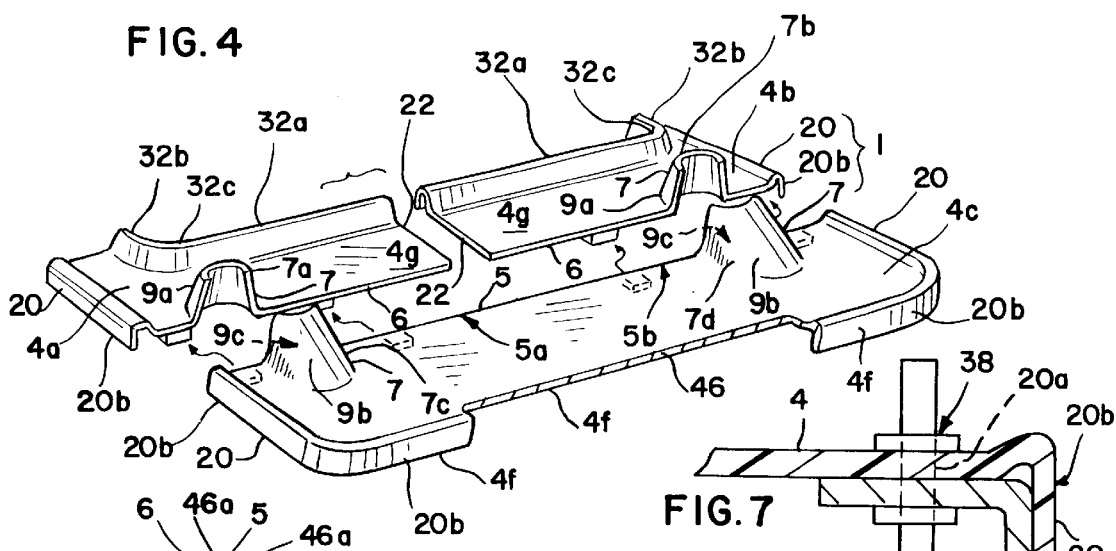
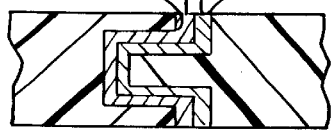
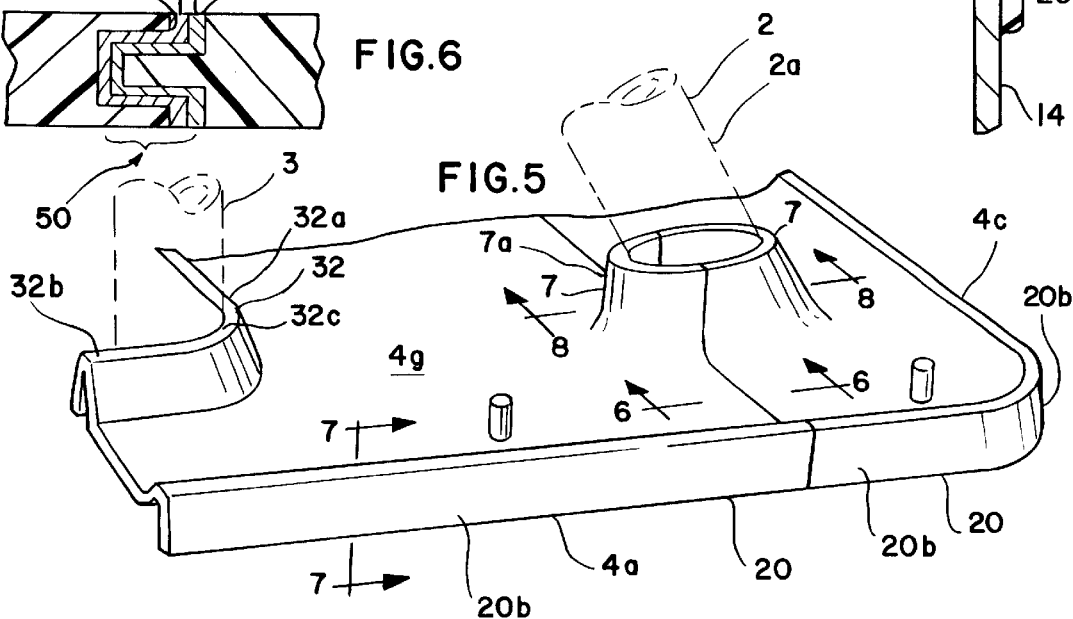
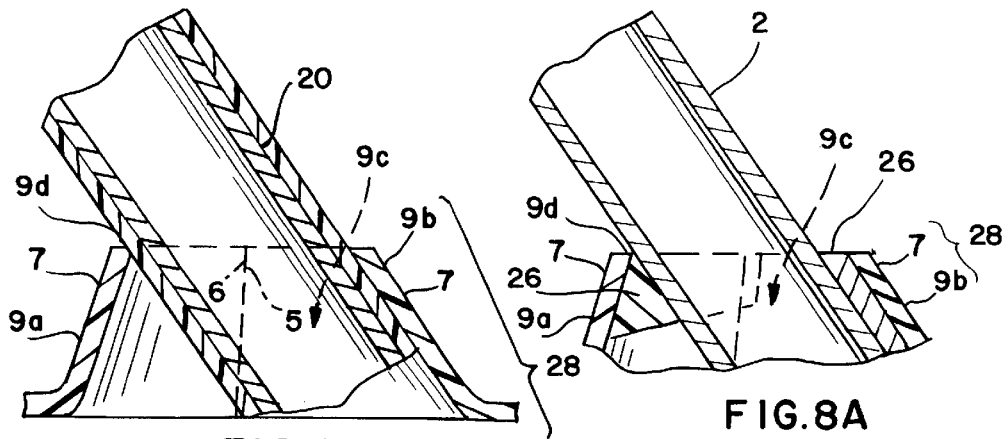

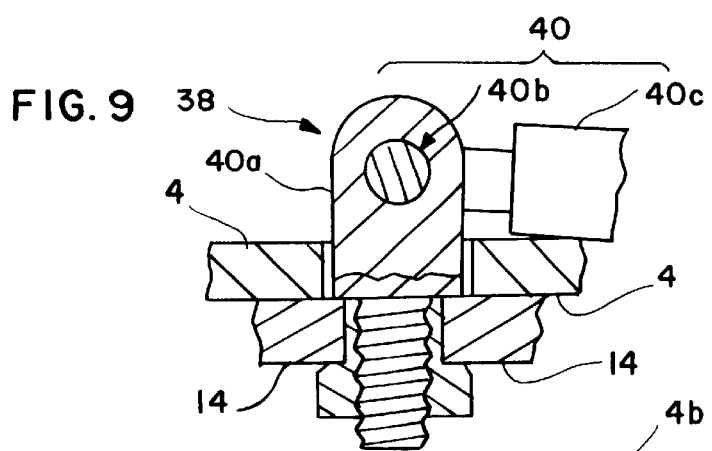
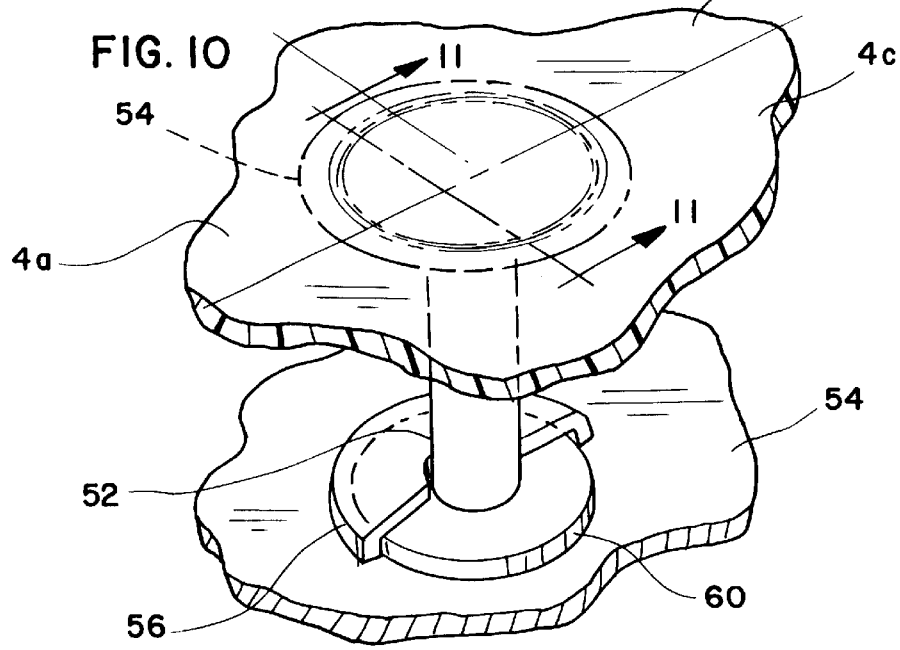
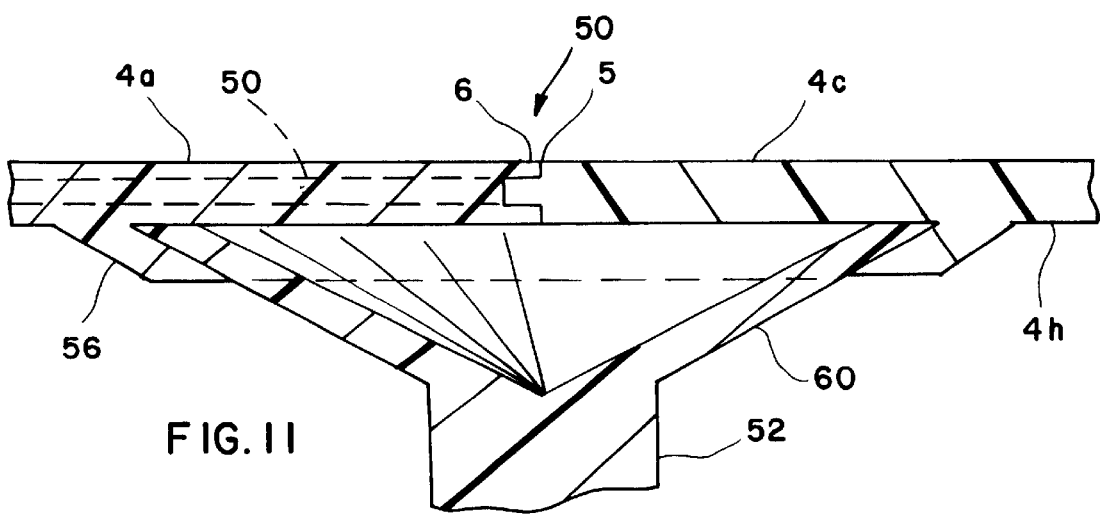

COVERLET FOR THE REAR PORTION OF A VEHICLE HAVING A ROLL BAR

This application claims the benefit of the previously filed U.S. Provisional Application, Serial No. 60/140,046, filed Jun. 18, 1999.

BACKGROUND OF THE INVENTION

This invention relates to a coverlet for the rear portion of a vehicle having a roll bar comprising a plurality of rigid panels, each panel having at least one means for partially surrounding an upstanding portion of the roll bar. The coverlet is preferably made of fiberglass impregnated with a nylon mesh for added strength.

In a preferred embodiment of the present invention, as depicted in the pictures, attached to and made a part of the Provisional Application, the coverlet covers the rear interior space of a mid-90s JEEP WRANGLER. The nine pictures identified as 1–9 show a preferred embodiment of the coverlet of the instant invention for a 1995 JEEP WRANGLER. Preferably, the coverlet for this embodiment comprises three sections which allows it to be readily installed and removed. The three sections comprise two front mirror image sections and a rear section. Each of the two front sections has a leading flanged edge which adds stiffness and support to the front panels to reduce flexion. The stiffening effect of the flange or suitable alternative stiffening means promotes connection of the center edges of the respective front panels. Preferably, these center edges comprise a tongue and groove sealing relationship respectively.

The leading edge flange also serves to reduce water from running into the interior of the vehicle. As shown in the attached picture, this leading edge also continues around the side of the upstanding roll bar extending forward.

Alternative technology is available in soft vinyl covers. The prior art vinyl covers use hook and loop connection to the vehicle as well as strip members to hold vinyl in place. Flexible vinyl does not make a preferred sealing connection around the upstanding roll bars.

ADVANTAGES OF THIS INVENTION

To alleviate this problem, and others which will become apparent from the disclosure which follows, the present invention, unlike vinyl coverlets which may reduce rain intrusion into the rear interior section of the vehicle, the plurality of rigid panels of the instant device eliminate the noise associated with a flapping vinyl member and the coverlet of the instant invention can be lockingly secured in place. Thus, valuables can be securely stored under the coverlet of the instant invention.

Advantages of the instant invention are that it allows for a quiet and secure cover of the rear portion of the interior of a vehicle minimizing water infusion and theft of the contents thereof.

The preferred embodiments include a coverlet for this embodiment comprising three sections which allow it to be readily installed and removed. The three sections comprise two front mirror image sections and a rear section. Each of the two front sections has a leading flanged edge which adds stiffness and support to the front panels to reduce flexion. The stiffening effect of the flange or suitable alternative stiffening means promotes connection of the center edges of the respective front panels. Preferably, these center edges comprise a tongue and groove sealing relationship respectively.

The upstanding collar formed on the rear hood preferably provides a smooth curve from the horizontal portions of the rear panel—the curve approaching the angle of the upstanding roll bar to which it engages.

The outer side edges of the rear panel preferably have a downwardly extending lip. Additionally, the rear panel can be secured to the vehicle through bore holes appropriately disposed in alignment with the existing bore holes in the upper edges of the vehicle sidewalls and secured with means as provided for the front panels. The rear edge of the rear panel may further have a downwardly extending lip. Preferably a central portion of the rear edge of the rear panel will have a reduced or eliminated lip to accommodate movement of the rear tail gate of the vehicle. Since contact and wear may occur to this edge portion, an aluminum edge may be incorporated into the fiberglass above the tail gate.

Without departing from the generality of the invention disclosed herein, the coverlet could be further strengthened to accommodate excessive live loads with the rear panel in particular being structurally enhanced to resist vertical deflection.

Additionally there is a tongue and groove connection between the rear edge of the front panel and the front edge of the rear panel. Preferably this tongue and groove connection utilizes an aluminum tongue and groove element integrated into the respective fiber glass panels.

Furthermore, the at least one means for surrounding an upstanding portion of the roll bar for each of the front panels comprises a recess designed to fit around a portion of the rear upstanding roll bar. This front panel recess is designed to mate with one of the recesses disposed on the rear panel. Preferably, mated recesses of the front panels and the rear panel sealingly surround the rear roll bar posts.

Each of the front panels may further have an outer side edge with a downwardly extending lip which may rest upon an upstanding side edge of the vehicle. Each of said front panels may further have at least one borehole which is proximate to the outer side edge to accommodate a bolt securing coverlet to the upstanding side edge of the vehicle. Preferably the securing bolt includes a locking mechanism. The locking mechanism may include a keyed hood lock.

The interior side edges of the front panels, as previously mentioned, may be tongued and grooved. Preferably, the tongue and groove connections are made of aluminum integral with the fiberglass panel. Moreover, materials other than fiberglass could be used for the coverlet including various forms of plastic, such as a polypropylene. Preferably the plastics employed would be coated or of suitable composition as to not degrade when subjected to ultraviolet sun rays. Alternatively, metals, including aluminum and steel would be structurally well suited for the panels and appear aesthetically pleasing.

An alternative roll bar arrangement for a late model Jeep Wrangler is shown in the catalog page 17 of *The Authority On Accessories for JEEP, CJ WRANGLER, SUZUKI SAMURAI, SIDEKICK, AND GEO TRACKER* issued by Keystone Automotive, which was filed with the Provisional Application. The coverlet for this late model configuration of the roll bar attached to a Jeep Wrangler would require only two panels, although a three panel coverlet could also be employed. Because of the larger spacing between the front and rear roll bar posts, one front panel extending from one side of the vehicle to the other would suffice. The rear panel may well be the same as that for the three panel configuration described above and the other panel will easily be configured substantially similar to a joined configuration similar to the permanently joined set of front panels. For this alternative configuration roll bar there is no need to separate the front panels, one elongated front panel may suffice.

Another advantage is that the fiberglass or preferred rigid material may be painted and/or pigmented to provide a matching color to the vehicle once the coverlet is applied.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

Still other advantages will be apparent from the disclosure that follows.

SUMMARY OF THE INVENTION

This invention teaches a coverlet for the rear portion of a vehicle having a roll bar comprising a plurality of rigid panels, each panel having at least one means for surrounding an upstanding portion of a roll bar. In a preferred embodiment of the present invention, since most vehicles have padded roll bar members, the use of fiberglass or other rigid materials allow the formation and use of the means for surrounding an upstanding portion of the roll bar to include an upstanding collar portion which may be molded to form a tight fit on the padded bar, thus providing a water tight connection without the need of additional sealing means. Additional sealing means may nonetheless be employed, particularly in instances where the upstanding post is not already padded.

The coverlet of the present invention is for use in a rear compartment of a vehicle, having opposing side walls, a back wall with a moveable tail gate, and at least one upstanding post, such as a padded roll bar, extending from the rear compartment. The coverlet comprises a plurality of rigid panels. Each of the plurality of rigid panels has one of a forward mating edge and a rearward mating edge, with each rearward mating edge adapted to connect to at least one forward mating edge. Each of the plurality of rigid panels has at least one outer side edge and at least one fixed means for partially surrounding one of the at least one upstanding post.

Each of the at least one fixed means for partially surrounding one of the at least one upstanding post is disposed adjacent to one of the forward mating edge and the rearward mating edge. The plurality of rigid panels is connectedly arrayed over the rear compartment with the outer side edge of each of the plurality of rigid panels disposed proximate to one of the opposing side walls, with each rearward mating edge connected to at least one forward mating edge, and with at least two of the at least one fixed means for partially surrounding one of the at least one upstanding post surrounding each at least one upstanding post.

In this way, the rear compartment of a vehicle with at least one upstanding post extending therefrom can be covered by the connected plurality of panels with each the at least one upstanding post is surrounded by at least two of the panels.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 4 is an exploded perspective view of the coverlet for a vehicle having a roll bar of the present invention showing an unattached coverlet from FIG. 2;

FIG. 5 is a fragmentary perspective view of the driver's side of the coverlet for the rear portion of a vehicle having a roll bar of the present invention from FIG. 2;

FIG. 6 is a fragmentary cross sectional view taken along the line 6—6 of FIG. 5 showing tongue and groove joint;

FIG. 7 is a fragmentary side elevation view taken along the line of 7—7 of FIG. 5 showing the securing arrangement between one of the opposing side walls and outer side edge of one of the panels of the coverlet of the present invention;

FIG. 8 is a fragmentary side elevation view taken along the line 8—8 of FIG. 5 showing the arrangement between a padded upstanding post surrounded by the respective shrouds of connected arrays of panels of the coverlet for the rear portion of a vehicle having a roll bar of the present invention;

FIG. 8A is a fragmentary side elevation view taken along the line 8—8 of FIG. 5 showing the arrangement between an unpadded upstanding post surrounded by the respective shrouds of connected arrays of panels of the coverlet of the present invention further having a means for resisting intrusion of rain;

FIG. 9 is a detailed side elevation cut away view of a hood lock to secure panels of a coverlet to an opposing side wall;

FIG. 10 is a cut away perspective view for a means for vertically supporting the panels and securing same of the present invention;

FIG. 11 is a fragmentary cross sectional view taken along the line 11—11 of FIG. 10 showing a tapered end of a pedestal and flange elements disposed on the lower surfaces of the panels;

DESCRIPTION

Figure 1:
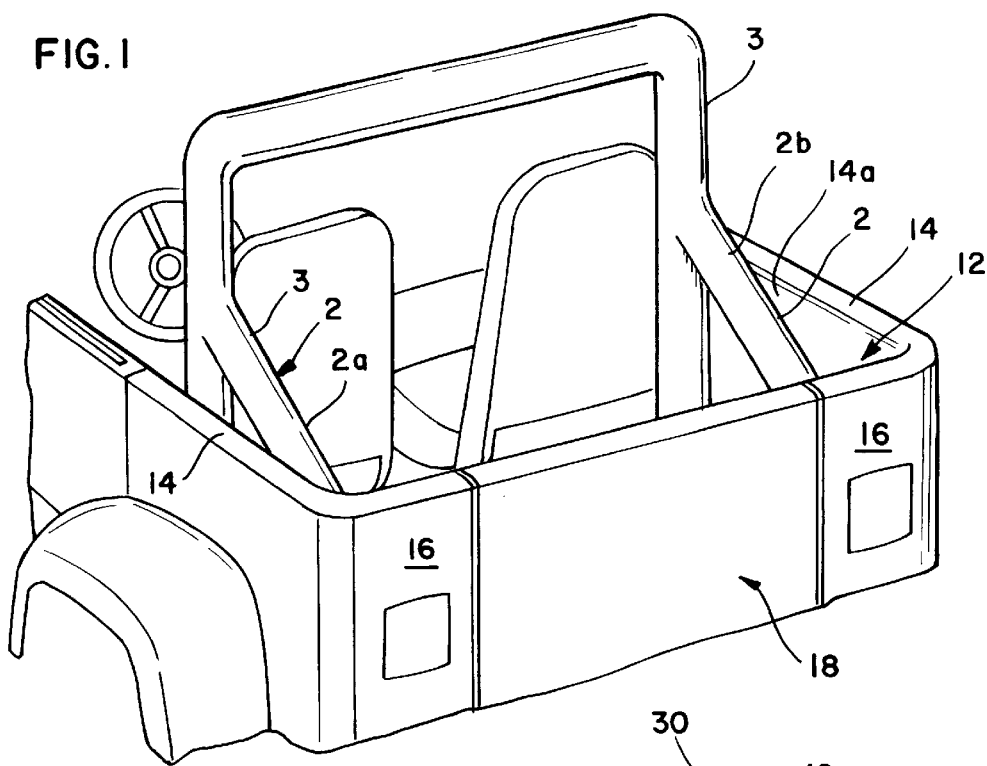
FIG. 1 is a fragmentary perspective view of a vehicle having a rear compartment with at least one upstanding post extending from the compartment.

The coverlet 1 of the present invention is for use in a rear compartment 12 of a vehicle, having opposing side walls 14, a back wall 16 with a moveable tailgate 18, and at least one upstanding post 2, such as a padded roll bar 3, extending from the rear compartment. The coverlet comprises a plurality of rigid panels 4. Each of the plurality of rigid panels has one of a forward mating edge 5 and a rearward mating edge 6, with each rearward mating edge adapted to connect to at least one forward mating edge. Each of the plurality of rigid panels has at least one outer side edge 20 and at least one fixed means 7 for partially surrounding one of the at least one upstanding post 2.

Each of the at least one fixed means for partially surrounding one of the at least one upstanding post can be disposed adjacent to one of the forward mating edge 5 and the rearward mating edge 6. The plurality of rigid panels 4 can be connectedly arrayed over the rear compartment with the outer side edge 20 of each of the plurality of rigid panels disposed proximate to one of the opposing side walls 14, with each rearward mating edge 6 connected to at least one forward mating edge 5, and with at least two of the at least one fixed means 7 for partially surrounding one of the at least one upstanding post surrounding each at least one upstanding post 2.

In this way, the rear compartment 12 of a vehicle with at least one upstanding post 2 extending therefrom can be covered by the connected plurality of rigid panels 4 with each of the at least one upstanding post surrounded by at least two of the panels 4. The discussion that follows, without limiting the scope of the invention, will refer to the invention as depicted in the drawing.

The coverlet 1 of the present invention is for use in a rear compartment 12 of a vehicle, having opposing side walls 14, a back wall 16 with a moveable tailgate 18, and at least one upstanding post 2, such as a padded roll bar 3, extending from the rear compartment 12. The coverlet comprises a plurality of rigid panels 4. Each of the plurality of rigid panels has one of a forward mating edge 5 and a rearward mating edge 6, with each rearward mating edge adapted to connect to at least one forward mating edge. Each of the plurality of rigid panels has at least one outer side edge 20 and at least one fixed means 7 for partially surrounding one of the at least one upstanding post 2.

Figure 12:
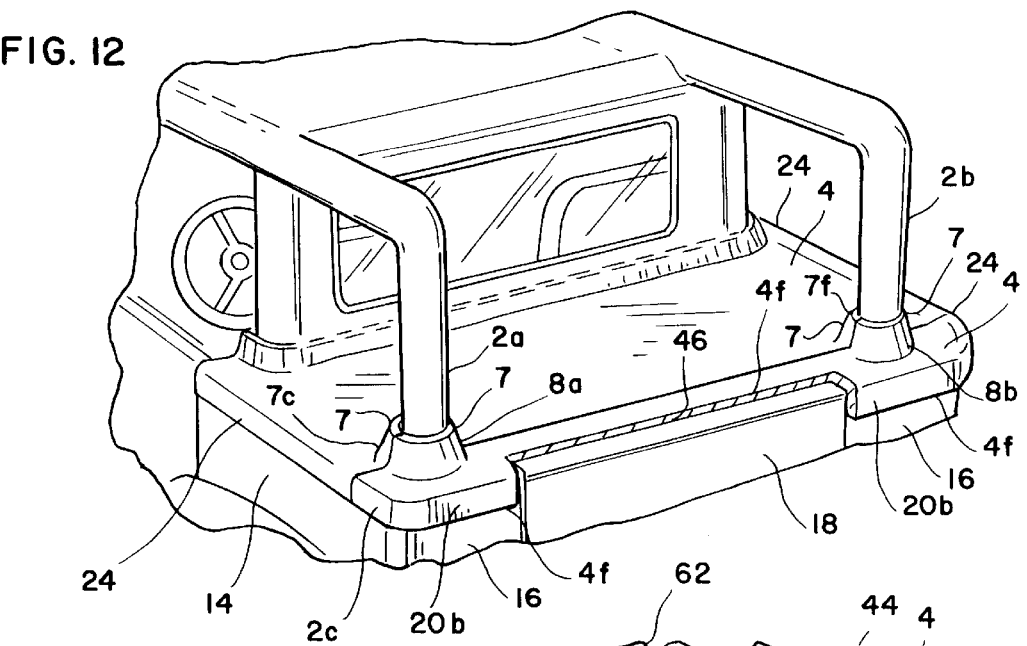
FIG. 12 is a fragmentary perspective view of a coverlet for the rear portion of a vehicle having a roll bar of the present invention with the coverlet disposed on a newer model jeep vehicle.

Each of the at least one fixed means 7 for partially surrounding one of the at least one upstanding post 2 can be disposed adjacent to one of the forward mating edge 5 and the rearward mating edge 6. The plurality of rigid panels can be connectedly arrayed over the rear compartment, as shown in FIGS. 2 and 12, with the outer side edge 20 of each of the plurality of rigid panels 4 disposed proximate to one of the opposing side walls 14, with each rearward mating edge 6 connected to at least one forward mating edge 5, and with at least two of the at least one fixed means 7 for partially surrounding one of the at least one upstanding post surrounding each at least one upstanding post 2.

In this way, the rear compartment 12 of a vehicle with at least one upstanding post 2 extending therefrom can be covered by the connected plurality of panels 4 with each the at least one upstanding post 2 is surrounded by at least two of the panels 4.

Figure 3:
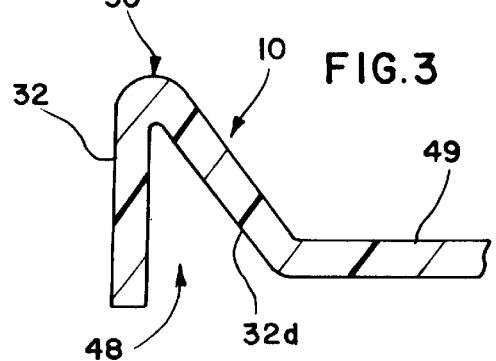
FIG. 3 is a cross sectional view taken along the line 3—3 of FIG. 2 of the coverlet for the rear portion of a vehicle having a roll bar of the present invention showing the configuration of the standing collar.
Figure 2:
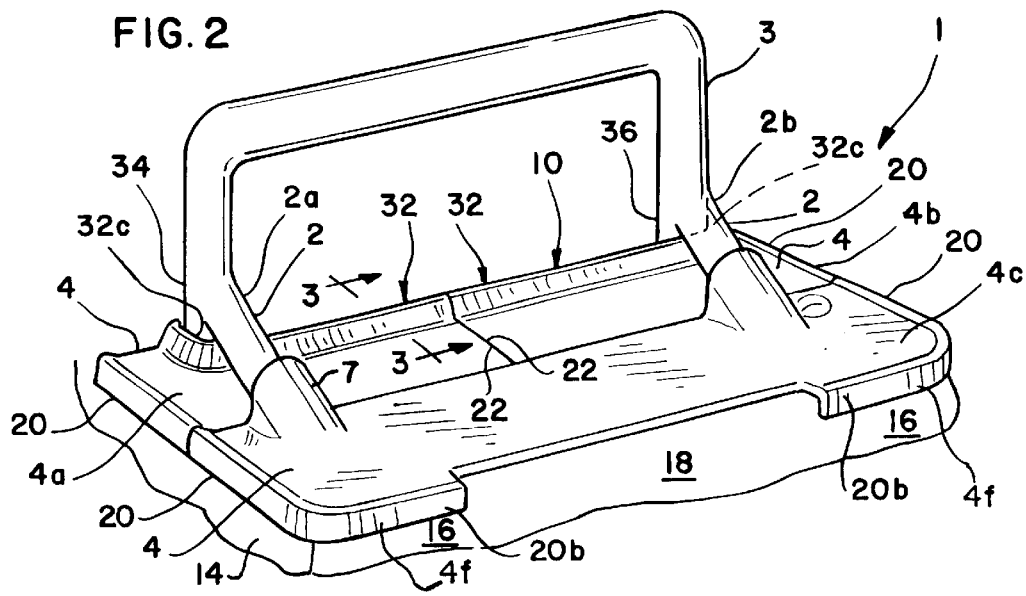
FIG. 2 is a fragmentary perspective view of the roll bar of the vehicle of FIG. 1 with the coverlet of the present invention disposed over the rear compartment.

A coverlet for a rear compartment of a vehicle, such as the 1995 JEEP WRANGLER shown in FIGS. 1–3, has opposing side walls 14 and a first upstanding post 2a and a second upstanding post 2b that extend from the rear compartment 12. It comprises a first rigid panel 4a, a second rigid panel 4b, and a third rigid panel 4c. The first rigid panel 4a and the second rigid panel 4b each have a rearward mating edge 6. The third rigid panel 4c has a forward mating edge 5. The rearward mating edges of the first rigid panel and the second rigid panel are adapted to connect to the forward mating edge of the third rigid panel.

Each of the rigid panels 4 has an outer side edge 20, and the first rigid panel 4a and the second rigid panel 4b each have an inner side edge 22. The first rigid panel 4a has a first fixed means 7a for partially surrounding the first upstanding post 2a. The first fixed means 7a is disposed adjacent to the rearward mating edge 6. The second rigid panel 4b has a second fixed means 7b for partially surrounding the second upstanding post 2b. The second fixed means 7b is disposed adjacent to the rearward mating edge 6. The third rigid panel 4c has a third fixed means 7c for partially surrounding the first upstanding post 2a and a fourth fixed means 7d for partially surrounding the second upstanding post 2b. The third fixed means 7c and the fourth fixed means 7d are disposed adjacent to the forward mating edge 5.

As best shown in FIG. 2, the rigid panels 4 can be connectedly arrayed over the rear compartment 12 with the outer side edge 20 of each of the rigid panels 4 disposed proximate to one of the opposing side walls 14. Referring to FIG. 4, the inner side edge 22 of the first rigid panel 4a is connected to the inner side edge 22 of the second rigid panel 4b with the rearward mating edge 6 of the first rigid panel 4a connected to a first portion 5a of the forward mating edge 5 of third rigid panel 7c and the rearward mating edge 6 of the second rigid panel 4b connected to a second portion 5b of the forward mating edge 5 of the third rigid panel 4c.

The first fixed means 7a and the third fixed means 7c surround the first upstanding post 2a and the second fixed means 7b and the fourth fixed means 7d surround the second upstanding post 2b. The rear compartment 12 of the vehicle with two upstanding posts 2 extending therefrom can be covered by the connected first, second and third rigid panels (4a, 4b and 4c) with the two upstanding posts (2a and 2b) surrounded by the panels 4.

Figure 14:
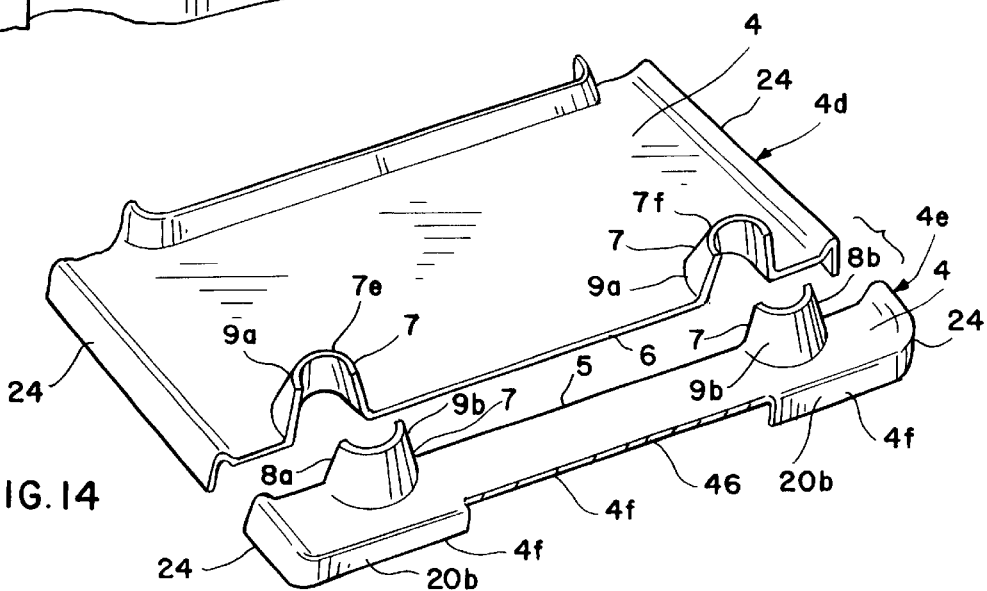
FIG. 14 is an exploded perspective view of the coverlet of the present invention employed in FIG. 12.

In a preferred embodiment, as shown in FIGS. 12 and 14, for use with a Post-1996 JEEP WRANGLER that has a rear compartment 12 with opposing side walls 14 and a first upstanding post 2a and a second upstanding post 2b that extend from the rear compartment, the preferred coverlet comprises a fourth rigid panel 4d and a fifth rigid panel 4e. The fourth rigid panel has a rearward mating edge 6 and the fifth rigid panel 4e has a forward mating edge 5. The rearward mating edge 6 of the fourth rigid panel is adapted to connect to the forward mating edge 5 of the fifth rigid panel 4e. Each of the rigid panels has two opposing outer side edges 24. The fourth rigid panel 4d has a fifth fixed means 7e for partially surrounding the first upstanding post 2a and a sixth fixed means 7f for partially surrounding the second upstanding post 2b.

The fifth fixed means 7e is disposed adjacent to the rearward mating edge 6. The fifth rigid panel 4e has a first complementary fixed means 8a for partially surrounding the first upstanding post 2a, and the fifth rigid panel 4e has a second complementary fixed means 8b for partially surrounding the second upstanding post 2b. The first and second complementary fixed means are disposed adjacent to the forward mating edge 5. The rigid panels can be connectedly arrayed over the rear compartment, as shown in FIG. 12, with the opposing outer side edge 24 of each of the rigid panels disposed proximate to one of the opposing side walls 14, with the rearward mating edge 6 of the fourth rigid panel 4d connected to the forward mating edge 5 of the fifth rigid panel 4e. The fifth fixed means 7e and the first complementary fixed means 8a surround the first upstanding post 2a, and the sixth fixed means 7f and the second complementary fixed means 8b surround the second upstanding post 2b.

Referring again to FIG. 12, the rear compartment of the post-1996 JEEP WRANGLER with two upstanding posts 2 extending therefrom can be covered by the connected fourth and fifth rigid panels with the two upstanding post surrounded by the panels.

In another preferred embodiment of the coverlet for a rear compartment of a vehicle, each of the at least one fixed means 7 for partially surrounding one of the at least one upstanding post 2 comprises one of an upstanding shroud 9a and an upstanding complementary shroud 9b, as shown in FIGS. 8 and 8A. Each upstanding shroud 9a is adapted to engage one of the upstanding complementary shroud 9b to surround one of the at least one upstanding post 2.

Preferably, one of the upstanding shroud and the upstanding complementary shroud has an interior recess 9c with a shape conforming with the one of the at least one upstanding post 2, and the other of the upstanding shroud and the upstanding complementary shroud has an upper border 9d contoured to conform with the one of the at least one upstanding post 2.

Additionally, the interior recess 9c and the upper border 9d may each have a means for resisting 26 the intrusion of rain along a surrounded section 28 of the at least one upstanding post 2 comprising a compressible sealing material.

Referring to FIGS. 2–4, another preferred embodiment is shown wherein each of the plurality of rigid panels 4 that has the rearward mating edge 6 comprises means for controlling flexion 10 of the panel 4 disposed along a leading edge 30. The means for controlling flexion 10 comprises an upstanding collar 32 extending upwardly from a generally planar upper surface of the panel 4. This collar is designed to fit around a first roll bar post 34 and a second roll bar post 36. The collar 32 has a first surface 32a and a second surface 32b connected at an intersection 32c, with the intersection of the collar disposed adjacent to one of the first roll bar post 34 and the second roll bar post 36 when the panels 4 are connectedly arrayed over the rear compartment 12.

To secure the contents of the rear compartment, the at least one outer side edge 20 of each of the plurality of rigid panels 4 preferably extends over one of the opposing side walls 14 of the rear compartment 12, as best shown in FIG. 7. The at least one outer side edge 20 of each of the plurality of rigid panels may further have at least one borehole 20a for receiving a means for securing 38 the panel 4 to the one of the opposing side walls 14 over which it extends, as shown in FIG. 7. Additionally, the means for securing 38 may comprise a hood lock 40 having a securing post 40a with a hole 40b disposed near the top and a lock 40c that can be fixed in the hole 40b, as shown in FIG. 9.

Figure 13:
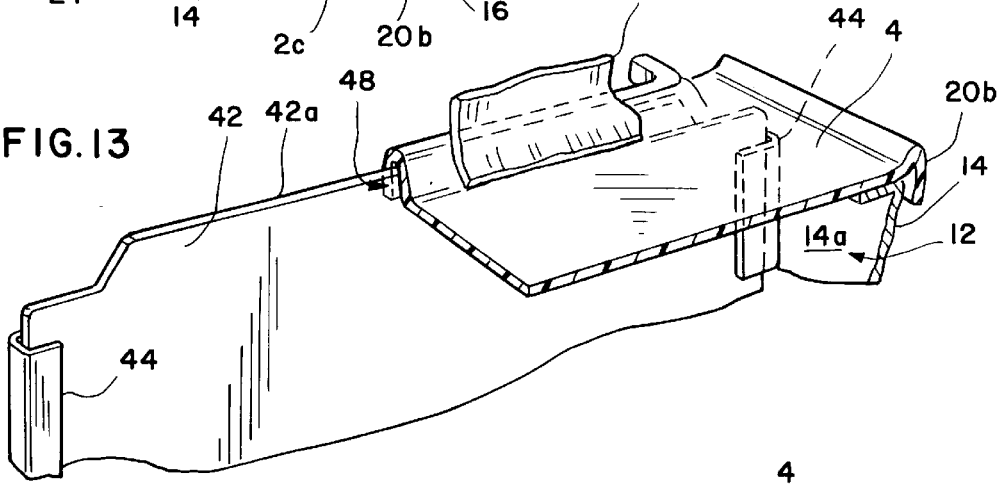
FIG. 13 is a partial cut away perspective view showing a preferred arrangement for a securing wall with its upper edge disposed in the recess of the collar.

To secure the front of the rear compartment 12, when for example the vehicle is attended by a valet, the coverlet 1 further comprises a lead wall 42 that can be vertically disposed between a pair of side wall securing guides 44, as shown in FIG. 13. Each of the pair of side wall securing guides is vertically disposed along an interior surface 14a of one of the opposing side walls 14, and the lead wall 42 is vertically disposed between the guides 44. Ideally, the guides are disposed below the connected plurality of panels 4. Moreover, the upstanding collar 32 further serves to reduce the intrusion of rain into the passenger compartment, since it conveniently fits within the lower edge of back section of the passenger compartment enclosure 62, as shown in FIG. 13.

Working together to create a secure coverlet 1 for a rear compartment 12 of a vehicle, preferably, the at least one outer side edge 20 of each of the plurality of rigid panels 4 extends over one of the opposing side walls 14 of the rear compartment, the at least one outer side edge 20 of each of the plurality of rigid panels has at least one borehole 20a for receiving a means for securing 38 the panel 4 to the one of the opposing side walls 14 over which it extends, and the means for securing 38 comprises a hood lock 40 having a securing post 40a with a hole 40b disposed near the top and a lock 40c that can be fixed in the hole. Ideally, each of the at least one outer side edge 20 comprise a down turned lip 20b extending over one of the opposing side walls 14; each of the plurality of rigid panels 4 having the forward mating edge 5 comprise a back edge 4f with a down turned lip 20b extending over that portion of the back wall 16 free of the moveable tailgate 18; and the back edge 4f has an aluminum covering 46 extending along that portion of the back edge 4f proximate to the moveable tailgate 18.

Furthermore, in another preferred embodiment of the coverlet, each of the plurality of rigid panels 4 having the rearward mating edge 6 may comprise means for controlling flexion 10 of the panel 4 disposed along a leading edge 30. The means for controlling flexion has an upstanding collar 32 extending upwardly from a generally planar upper surface 4g of the panel with a lower surface 32d of the collar forming an elongated recess 48, and the lead wall 42 has an upper edge 42a with a length that is less than the length of the elongated recess 48 so that the upper edge 42a can be disposed in the elongated recess and the lead wall 42 thereby secured, as shown in FIG. 13.

Preferably, the forward mating edge 5 is adapted to sealingly join with the rearward mating edge 6 to resist the intrusion of rain there between. Means for sealingly joining the forward mating edge to the rearward mating edge may comprise a tongue and groove joint 50, as shown in FIG. 6. An aluminum covering 46a extending along the joint may be employed.

Additionally, each of the plurality of rigid panels 4 having the rearward mating edge 6 may comprise an inner side edge 22 and means for sealingly joining the inner side edge of one of the plurality of rigid panels to the inner side edge of another of the plurality of rigid panels. This means for sealingly joining may comprise a tongue and groove joint 50, as shown in FIG. 11.

As shown in FIG. 13 of the drawing, a preferred coverlet 1 for a rear compartment 12 of a vehicle of the present invention comprises a lead wall 42 and a pair of side wall securing guides 44 with each of the pair of side wall securing guides vertically disposed along an interior surface 14a of one of the opposing side walls 14 and the lead wall 42 is vertically disposed between the guides 44, with the guides disposed below the connected plurality of panels 4, and with each of the plurality of rigid panels 4 having the forward mating edge 5 comprising a back edge 4f with a down turned lip 20b extending over that portion of the back wall 16 free of the moveable tailgate 18; and with each of the plurality of rigid panels having the rearward mating edge comprising means for controlling flexion 10 of the panel 4 disposed along a leading edge 30. The means for controlling flexion has an upstanding collar 32 extending upwardly from a generally planar upper surface 4g of the panel with a lower surface 32d of the collar forming an elongated recess 48. The lead wall 42 has an upper edge 42a with a length that is less than the length of the elongated recess. The upper edge 42a can be disposed in the elongated recess 48 and the lead wall 42 thereby secured.

Furthermore, the at least one outer side edge 20 of each of the plurality of rigid panels 4 comprises a down turned lip 20b extending over one of the opposing side walls 14, and the at least one outer side edge 20 of each of the plurality of rigid panels has at least one borehole 20a for receiving a means for securing 38 the panel 4 to the one of the opposing side walls 14 over which it extends. The means for securing comprises a hood lock 40 has a securing post 40a with a hole 40b disposed near the top and a lock 40c that can be fixed in the hole. Additionally, the forward mating edge 5 may be adapted to sealingly join with the rearward mating edge 6 to resist the intrusion of rain there between. The means for sealingly joining the forward mating edge to the rearward mating edge may comprise a tongue and groove joint 50 which has an aluminum covering 46a extending along the joint.

Preferably, each of the plurality of rigid panels 4 having the rearward mating edge 6 comprises an inner side edge 22 and means for sealingly joining the inner side edge of one of the plurality of rigid panels to the inner side edge of another of the plurality of rigid panels. The means for sealingly joining may further comprise a tongue and groove joint 50. Another preferred aspect employs an aluminum covering 46a extending along a portion of the back edge 4f proximate to the moveable tailgate 18.

In order to secure the contents of the rear compartment of a vehicle, the forward and rearward mating edges respectively may have a second fastener disposed on a lower surface of the panels to lock the forward mating edge of one panel to the rearward mating edge of at least one of another of the plurality of rigid panels.

Furthermore, the coverlet may further provide on each of the plurality of rigid panels having the rearward mating edge and an inner side edge, means for sealingly joining the inner side edge of one of the plurality of rigid panels to the inner side edge of another of the plurality of rigid panels. The means for sealingly joining may comprise a first fastener disposed on a lower surface of the panels to lock the inner side edge of one of the plurality of rigid panels to the inner side edge of another of the plurality of rigid panels.

One of the advantages of a rigid panel coverlet is the apparent ability of a user to place objects on top of the coverlet. Preferably, means for vertically supporting the plurality of rigid panels connectedly arrayed over the rear compartment are included. As best shown in FIGS. 10 and 11, a pedestal 52 disposed between a floor 54 of the rear compartment of the vehicle and lower surface 4h of the plurality of rigid panels 4. The lower surface 4h of the connected panels has a first flange 56 and the floor 54 of the rear compartment has a second flange 58 for receiving tapered ends 60 of the pedestal 52. The first and second flanges (56, 58) restrict the vertical movement of the pedestal 52 and the connected panels 4 to secure the coverlet 1 in place.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

The invention resides not in any one of these features per se, but rather in the particular combination of all of them herein disclosed and claimed and it is distinguished from the prior art in this particular combination of all of its structures for the function specified.

For a better understanding of the invention, its operating advantages and the specific objects attained by its uses, reference should be made to the referenced pictures and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the pictures and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coverlet for a rear compartment of a vehicle, having opposing side walls, a back wall with a moveable tailgate, and at least one upstanding post extending from the rear compartment, comprising a plurality of rigid panels, each of the plurality of rigid panels having one of a forward mating edge and a rearward mating edge, with each rearward mating edge adapted to connect to at least one forward mating edge, each of the plurality of rigid panels having at least one outer side edge, each of the plurality of rigid panels having at least one fixed means for partially surrounding one of the at least one upstanding post, each of said at least one fixed means for partially surrounding one of the at least one upstanding post being disposable adjacent to one of the forward mating edge and the rearward mating edge, whereby, said plurality of rigid panels being connectedly arrayed over the rear compartment, with the outer side edge of each of the plurality of rigid panels being disposed proximate to one of the opposing side walls of the vehicle, each rearward mating edge connected to at least one forward mating edge, and at least two of the at least one fixed means for partially surrounding one of the at least one upstanding post surrounding each at least one upstanding post, so that the rear compartment of the vehicle with at least one upstanding post extending therefrom can be covered by the connected plurality of panels with each said at least one upstanding post being surrounded by at least two of said panels.

2. The coverlet for a rear compartment of a vehicle of claim 1, wherein each of the at least one fixed means for partially surrounding one of the at least one upstanding post comprises one of an upstanding shroud and an upstanding complementary shroud, each of said upstanding shroud being adapted to engage one of the upstanding complementary shroud to surround one of the at least one upstanding post.

3. The coverlet for a rear compartment of a vehicle of claim 2, wherein one of the upstanding shroud and the upstanding complementary shroud has an interior recess with a shape conforming with the one of the at least one upstanding post, and the other of the upstanding shroud and the upstanding complementary shroud has an upper border contoured to conform with the one of the at least one upstanding post.

4. The coverlet for a rear compartment of a vehicle of claim 3, wherein the interior recess and the upper border each have a means for resisting the intrusion of rain along a surrounded section of the at least one upstanding post comprising a compressible sealing material.

5. The coverlet for a rear compartment of a vehicle of claim 1, wherein each of the plurality of rigid panels having the rearward mating edge comprises means for controlling flexion of said panel disposed along a leading edge,
said means for controlling flexion having an upstanding collar extending upwardly from a generally planar upper surface of said panel.

6. The coverlet for a rear compartment of a vehicle of claim 1, wherein the at least one outer side edge of each of the plurality of rigid panels extends over one of the opposing side walls of the rear compartment.

7. The coverlet for a rear compartment of a vehicle of claim 6, wherein the at least one outer side edge of each of the plurality of rigid panels has at least one borehole for receiving a means for securing said panel to the one of the opposing side walls over which it extends.

8. The coverlet for a rear compartment of a vehicle of claim 7, wherein the means for securing comprises a hood lock having a securing post with a hole disposed near the top and a lock that can be fixed in said hole.

9. The coverlet for a rear compartment of a vehicle of claim 1, further comprising a lead wall and a pair of side wall securing guides,
each of said pair of side wall securing guides being vertically disposed along an interior surface of one of said opposing side walls, and
said lead wall being vertically disposed between said guides.

10. The coverlet for a rear compartment of a vehicle of claim 9, wherein said guides are disposed below the connected plurality of panels.

11. The coverlet for a rear compartment of a vehicle of claim 10, wherein the at least one outer side edge of each of the plurality of rigid panels extends over one of the opposing side walls of the rear compartment, the at least one outer side edge of each of the plurality of rigid panels has at least one borehole for receiving a means for securing said panel to the one of the opposing side walls over which it extends, and the means for securing comprises a hood lock having a securing post with a hole disposed near the top and a lock that can be fixed in said hole.

12. The coverlet for a rear compartment of a vehicle of claim 11, wherein each of the plurality of rigid panels having the rearward mating edge comprises means for controlling flexion of said panel disposed along a leading edge,
said means for controlling flexion having an upstanding collar extending upwardly from a generally planar upper surface of said panel with a lower surface of said collar forming an elongated recess; and
wherein the lead wall has an upper edge with a length that is less than the length of the elongated recess,
said upper edge can be disposed in said elongated recess and the lead wall thereby secured.

13. The coverlet for a rear compartment of a vehicle of claim 6, wherein the forward mating edge is adapted to sealingly join with the rearward mating edge to resist the intrusion of rain there between.

14. The coverlet for a rear compartment of a vehicle of claim 13, wherein means for sealingly joining the forward mating edge to the rearward mating edge comprises a tongue and groove joint.

15. The coverlet for a rear compartment of a vehicle of claim 14, wherein the tongue and groove joint has an aluminum covering extending along the joint.

16. The coverlet for a rear compartment of a vehicle of claim 1, wherein each of the plurality of rigid panels having the rearward mating edge comprises an inner side edge and means for sealingly joining the inner side edge of one of the plurality of rigid panels to the inner side edge of another of the plurality of rigid panels,
said means for sealingly joining comprising a tongue and groove joint.

17. The coverlet for a rear compartment of a vehicle of claim 1, wherein each of the at least one outer side edge comprises a down turned lip extending over one of the opposing side walls.

18. The coverlet for a rear compartment of a vehicle of claim 1, wherein each of the plurality of rigid panels having the forward mating edge comprises a back edge with a down turned lip extending over that portion of the back wall free of the moveable tailgate.

19. The coverlet for a rear compartment of a vehicle of claim 18, wherein the back edge has an aluminum covering extending along that portion of the back edge proximate to the moveable tailgate.

20. The coverlet for a rear compartment of a vehicle of claim 3, further comprising a lead wall and a pair of side wall securing guides,
each of said pair of side wall securing guides being vertically disposed along an interior surface of one of said opposing side walls, and
said lead wall being vertically disposed between said guides,
said guides are disposed below the connected plurality of panels; and
wherein:
each of the plurality of rigid panels having the forward mating edge comprises a back edge with a down turned lip extending over that portion of the back wall free of the moveable tailgate;
each of the plurality of rigid panels having the rearward mating edge comprises means for controlling flexion of said panel disposed along a leading edge,
said means for controlling flexion having an upstanding collar extending upwardly from a generally planar upper surface of said panel with a lower surface of said collar forming an elongated recess;
the lead wall has an upper edge with a length that is less than the length of the elongated recess,
said upper edge can be disposed in said elongated recess and the lead wall thereby secured;
the at least one outer side edge of each of the plurality of rigid panels comprises a down turned lip extending over one of the opposing side walls; and
the at least one outer side edge of each of the plurality of rigid panels has at least one borehole for receiving a means for securing said panel to the one of the opposing side walls over which it extends, said means for securing comprises a hood lock having a securing post with a hole disposed near the top and a lock that can be fixed in said hole.

21. The coverlet for a rear compartment of a vehicle of claim 20, wherein the forward mating edge is adapted to sealingly join with the rearward mating edge to resist the intrusion of rain there between,
said means for sealingly joining the forward mating edge to the rearward mating edge comprises a tongue and groove joint which has an aluminum covering extending along the joint.

22. The coverlet for a rear compartment of a vehicle of claim 21, wherein each of the plurality of rigid panels having the rearward mating edge comprises an inner side edge and means for sealingly joining the inner side edge of one of the plurality of rigid panels to the inner side edge of another of the plurality of rigid panels,
said means for sealingly joining comprising a tongue and groove joint.

23. The coverlet for a rear compartment of a vehicle of claim 22, wherein the back edge has an aluminum covering extending along that portion of the back edge proximate to the moveable tailgate.

24. The coverlet for a rear compartment of a vehicle of claim 1, wherein each of the plurality of rigid panels having the rearward mating edge comprises an inner side edge and means for sealingly joining the inner side edge of one of the plurality of rigid panels to the inner side edge of another of the plurality of rigid panels,
said means for sealingly joining comprising a first fastener disposed on a lower surface of the panels to lock the inner side edge of one of the plurality of rigid panels to the inner side edge of another of the plurality of rigid panels.

25. The coverlet for a rear compartment of a vehicle of claim 1, wherein the forward and rearward mating edges respectively have a second fastener disposed on a lower surface of the panels to lock the forward mating edge of one panel to the rearward mating edge of at least one of another of the plurality of rigid panels.

26. The coverlet for a rear compartment of a vehicle of claim 1, further comprising and means for vertically supporting the plurality of rigid panels connectedly arrayed over the rear compartment comprising a pedestal disposed between a floor of the rear compartment of the vehicle and lower surface of the plurality of rigid panels.

27. The coverlet for a rear compartment of a vehicle of claim 26, wherein the lower surface of the connected panels has a first flange and the floor of the rear compartment has a second flange for receiving tapered ends of the pedestal,
said first and second flanges restrict the vertical movement of the pedestal and the connected panels to secure the coverlet in place.

28. A coverlet for a rear compartment of a vehicle having opposing side walls and a first upstanding post and a second upstanding post that extend from the rear compartment comprising:
a first rigid panel, a second rigid panel, and a third rigid panel,
said first rigid panel and said second rigid panel each have a rearward mating edge,
said third rigid panel has a forward mating edge,
the rearward mating edges of the first rigid panel and the second rigid panel are adapted to connect to the forward mating edge of the third rigid panel,
each of said rigid panels has an outer side edge and the first rigid panel and the second rigid panel each have an inner side edge,
the first rigid panel has a first fixed means for partially surrounding the first upstanding post,
said first fixed means being disposable adjacent to the rearward mating edge,
the second rigid panel has a second fixed means for partially surrounding the second upstanding post,
said second fixed means being disposable adjacent to the rearward mating edge,
the third rigid panel has a third fixed means for partially surrounding the first upstanding post and a fourth fixed means for partially surrounding the second upstanding post,
said third fixed means and said fourth fixed means being disposable adjacent to the forward mating edge,
whereby, said rigid panels can be connectedly arrayed over the rear compartment, with the outer side edge of each of said rigid panels being disposed proximate to one of the opposing side walls, the inner side edge of the first rigid panel being connected to the inner side edge of the second rigid panel, the rearward mating edge of the first rigid panel being connected to a first portion of the forward mating edge of third rigid panel and the rearward mating edge of the second rigid panel being connected to a second portion of the forward mating edge of the third rigid panel, and the first fixed means and the third fixed means can surround the first upstanding post and the second fixed means and the fourth fixed means can surround the second upstanding post, so that the rear compartment of the vehicle with two upstanding posts extending therefrom can be covered by the connected first, second and third rigid panels with the two upstanding post being surrounded by said panels.

29. A coverlet for a rear compartment of a vehicle having opposing side walls and a first upstanding post and a second upstanding post that extend from the rear compartment comprising:
a fourth rigid panel and a fifth rigid panel,
said fourth rigid panel having a rearward mating edge,
said fifth rigid panel having a forward mating edge, the rearward mating edge of the fourth rigid panel adapted to connect to the forward mating edge of the fifth rigid panel,
each of said rigid panels having two opposing outer side edges,
the fourth rigid panel having a fifth fixed means for partially surrounding the first upstanding post and a sixth fixed means for partially surrounding the second upstanding post,
said fifth fixed means being disposable adjacent to the rearward mating edge,
the fifth rigid panel having a first complementary fixed means for partially surrounding the first upstanding post, and the sixth rigid panel having a second complementary fixed means for partially surrounding the second upstanding post,
said first and second complementary fixed means being disposable adjacent to the forward mating edge,
whereby, said rigid panels can be connectedly arrayed over the rear compartment with the opposing outer side edge of each of said rigid panels being disposed proximate to one of the opposing side walls, the rearward mating edge of the fourth rigid panel being connected to the forward mating edge of the sixth rigid panel, and the fifth fixed means and the first complementary fixed means surrounding the first upstanding post and the sixth fixed means and the second complementary fixed means surrounding the second upstanding post, so that the rear compartment of the vehicle with two upstanding posts extending therefrom can be covered by the connected fifth and sixth rigid panels with the two upstanding post can be surrounded by said panels.

* * * * *